B. F. WHITNER.
Fertilizer.
No. 64,926. Patented May 21, 1867.
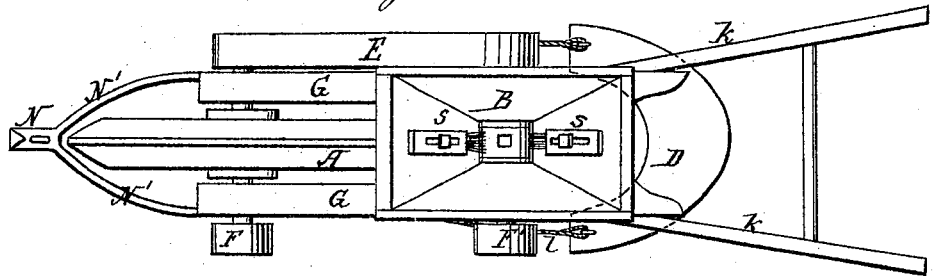
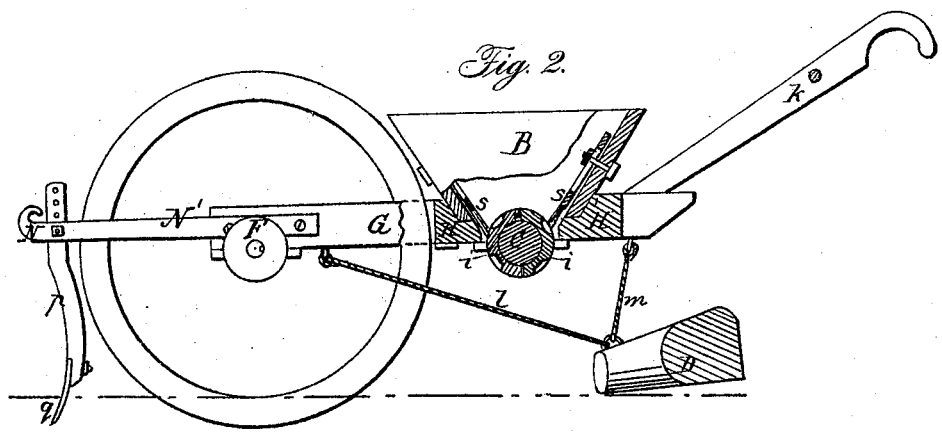
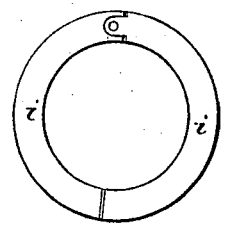
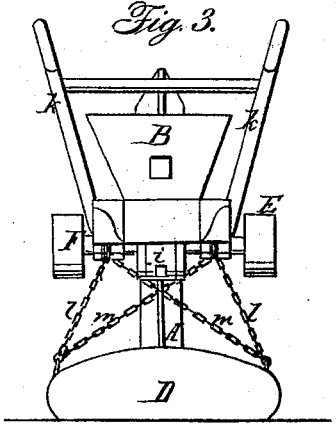
Witnesses:
G. B. Towles
Chas. M. Hay
Inventor:
Benjamin F. Whitner
By his Attorney Z. C. Robbins
AM. PHOTO-LITHO. CO. N.Y. (OSBORNE'S PROCESS)

United States Patent Office.

BENJAMIN F. WHITNER, OF MADISON, FLORIDA.

Letters Patent No. 64,926, dated May 21, 1867.

PLANTER AND MANURE DISTRIBUTER.

*The Schedule referred to in these Letters Patent and making part of the same.*

TO ALL WHOM IT MAY CONCERN:

Be it known that I, BENJAMIN F. WHITNER, of Madison, in the county of Madison, and State of Florida, have invented a new and improved Planter and Manure Distributer; and I do hereby declare that the following is a full and exact description thereof, reference being had to the accompanying drawings which form a portion of this specification.

Figure 1 is a top view of my improved planter and manure distributer.

Figure 2, a view which is partly a side elevation and partly a vertical section of said planter.

Figure 3, a rear elevation of the same; and

Figure 4 an enlarged side view of a detached portion of the planter.

Similar letters refer to corresponding parts in all the drawings.

The frame of my improved planter and manure distributer is composed of the side-rails G G and the transverse rails H H, which are respectively united with each other in any well-known or usual manner. Curving branches N' N', of a metallic head, N, are connected to the forward ends of the side-rails G G; and a vertical mortise in the said metallic head, N, receives the shank $p$ of the furrow-opening plough-point $q$. The double bevel-edged wheel A, which is pivoted between the front ends of the side-rails G G, serves the purpose of perfecting the shape of the furrow, which is roughly opened by the plough-point $q$, thereby enabling the seeds or kernels of grain to be all planted in a straight line, at a uniform depth, and at a uniform distance from each other. The seed-receptacle B is fitted to the sides of the opening within the side-rails G G and the transverse rails H H of the frame of the planter. The bottom of said seed-receptacle is closed by the planting-cylinder C, which works in bearing-boxes that may be secured to the under sides of the side-beams G G. A deep groove is formed in the central portion of the planting-cylinder C for the reception of the jointed metallic ring $i$, which is recessed to suit the particular kinds of seeds or grains to be planted, or fertilizer to be distributed. As many different planting-rings may be employed as there are different seeds or grains to be planted or fertilizers to be distributed by the machine. When the said metallic ring $i$ is removed from the planting-cylinder C, the planter may also, in some cases, be used for the purpose of distributing manure, plaster, &c., either in the furrows formed by the machine, or over growing plants, as circumstances may require. The adjustable brushes $s\ s$, which are held in their appropriate positions by set-screws, as shown in the drawings, serve the purpose of regulating the discharge seeds from the cavities in the planting-cylinder, and also of preventing the seeds or kernels of grain from getting jammed between the sides of the planting-cylinder and the sides of the grain-receptacle. A curved drag, of the peculiar shape represented in the drawings, is attached to the side-bars G G of the frame of the machine, by means of four chains, $l\ l$ and $m\ m$, in the manner represented by figs. 2 and 3 of the drawings. These chains being properly adjusted as to slackness, the forward movement of the planter will cause the extremities of the drag to partially bury themselves in the soil, and to draw the same inwards over the seeds deposited in the furrow, whilst the curved portion of said drag will compress the soil over the seeds to the requisite degree of hardness, and smoothly round off the same. The arbor of the furrow-wheel A, as also that of the planting-cylinder C, projects beyond the respective bearings of each arbor a sufficient distance to receive pulleys F F' on either or both ends thereof, and these pulleys are connected with each other by means of a band or bands E, which serve to transmit motion from the furrow-wheel to the planting-cylinder. There should be weight enough placed in front of the furrow-wheel A to balance the planter, and also the contents of the seed-receptacle. The planter being balanced on the furrow-wheel, and there being so short a distance between the furrow-wheel and the adjustable plough-point $q$, the planter can be easily guided to avoid stumps or other obstructions that may be in the line of its progress. In turning the planter, the covering-drag D will be kept in its proper position by the action of its short guiding chains $m\ m$.

Having thus fully described my improved planting and fertilizer-distributing machine, what I claim therein as new, and desire to secure by Letters Patent, is—

The combination of the furrow-opener $q$, the furrow-wheel A, and the covering-drag D, with each other and with the planting-cylinder C, and the seed-receptacle B, substantially in the manner and for the respective purposes herein set forth. I also claim the grooved planting-cylinder C when it is combined with a jointed and a recessed ring, $i$, and when the said cylinder works in combination with the furrow-opener $q$, the furrow-wheel A, and the covering-drag D, substantially in the manner herein set forth.

The aforegoing specification of my improved planter and manure distributer signed this eighth day of February, 1867.

BENJAMIN F. WHITNER.

Witnesses:
S. C. CRAIG,
WM. H. WHITNER.